Feb. 17, 1942.   A. B. NEWTON   2,273,804
CHEMICAL DEHUMIDIFYING SYSTEM
Filed Jan. 23, 1939
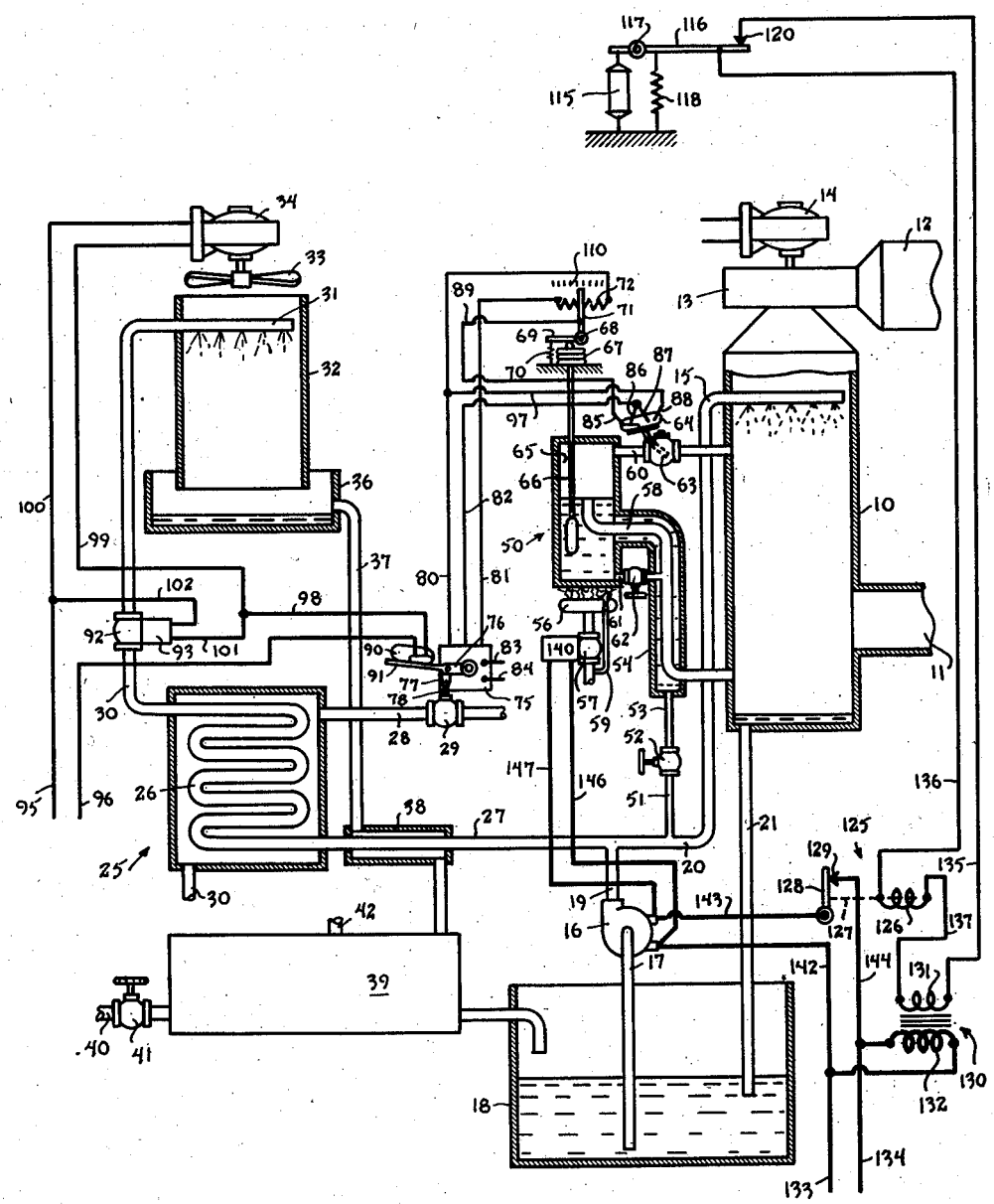
Inventor
Alwin B. Newton
By George H Fisher
Attorney Patented Feb. 17, 1942

2,273,804

UNITED STATES PATENT OFFICE 2,273,804

CHEMICAL DEHUMIDIFYING SYSTEM

Alwin B. Newton, Minneapolis, Minn., assignor to Minneapolis-Honeywell Regulator Company, Minneapolis, Minn., a corporation of Delaware Application January 23, 1939, Serial No. 252,378

2 Claims. (Cl. 159—44)

This invention relates to a chemical dehumidifying system and more particularly to a control system therefor.

In dehumidifying air by the use of a solution of a hygroscopic salt, such as lithium chloride, or calcium chloride, it is customary to spray the solution in a stream of air to be dehumidified, and the moisture of the air is absorbed by the solution, thus lowering the humidity of the air and at the same time reducing the concentration of the hygroscopic solution. In order that the solution may be used over and over again, it is necessary to drive off the moisture which is absorbed thereby, in order that the solution may be maintained sufficiently concentrated to effect the necessary dehumidification of the air, since as the solution becomes less concentrated, its power of absorbing the moisture in the air decreases. The reactivation of the solution should be carefully controlled, since if too much moisture is driven from the solution, the resulting high concentration thereof may result in crystallization of the salt in the solution.

One method that has been used for controlling the reactivation of the hygroscopic solution is by measuring the density of the solution, which varies in accordance with the concentration thereof, and controlling the amount of reactivation in accordance with the density. The density is measured by means of a hydrometer, but inasmuch as the concentration, or the vapor absorbing characteristics vary greatly with very small changes in the density, it has been found very difficult to accurately control the reactivation by this means.

Another method which has been proposed to measure the concentration and control the reactivation is by separating a sample of the solution whose concentration is to be measured and controlled from a weak solution of known concentration, which may be pure water, by an osmotic wall, and controlling the reactivation in accordance with the rate of flow through the wall, which will vary in accordance with the relative densities of the solution. Such a system is illustrated in the application of Raymond P. Mattern and William L. McGrath, Serial No. 198,986, filed March 30, 1938.

In accordance with my invention, the changes in concentration are measured by a relatively simple arrangement and one which responds rapidly to such changes, and the reactivating means is in turn controlled thereby. The boiling point of the solution varies in accordance with the concentration, and this property is availed of to control the reactivating means. A sample of the solution whose concentration is to be controlled is passed through a small boiler to which heat is constantly applied, and a device which responds to the boiling point of the solution in this boiler is arranged to control the reactivating means in a manner to maintain the boiling point thereof substantially constant, which in turn causes the concentration of the main body of the hygroscopic solution to be maintained substantially constant.

It is therefore an object of my invention to provide a novel control arrangement for controlling the reactivation of a hygroscopic fluid used in a chemical dehumidifying system.

More particularly it is an object of my invention to control the reactivation of a hygroscopic solution by controlling the amount of the reactivation in accordance with the boiling point thereof.

Other objects and advantages will become apparent upon a study of the specification, claims, and appended drawing wherein is illustrated a preferred form of my invention.

Referring more particularly to the drawing, an air conditioning chamber is represented by the reference character 10, this chamber including an inlet 11 and an outlet 12. A fan 13 is illustrated as being located at the upper portion of the chamber, this fan being driven by a suitable motor 14 and is provided to cause a circulation of air upwardly through the chamber 10. The outlet 12 may communicate with a space being conditioned and the inlet 11 may also communicate with the space or may communicate with a source of fresh air or if desired, a mixture of fresh and return air may circulate through the inlet 11 in a manner well known in the art.

Located adjacent the upper end of the chamber 10 is a spray 15 through which a hygroscopic fluid may issue, this spray contacting the upwardly flowing stream of air and removing a certain amount of moisture therefrom, thus lowering the relative humidity of the air. A pump 16 having an inlet connected by a pipe 17 to the interior of the tank 18 is provided for supplying fluid to the spray 15, the outlet of the pump 16 being connected to the spray by means of the pipes 19 and 20. The hygroscopic fluid is returned to the tank 18 by means of a pipe 21.

Inasmuch as the hygroscopic fluid absorbs water from the air passing through the chamber 10, the concentration of the fluid returning to the tank 18 will be less than the fluid in the tank and accordingly it is necessary to drive off this excess moisture from the hygroscopic fluid so as to maintain the concentration of the fluid in the tank 18 at a substantially constant value so that moisture absorbing property will be substantially constant during operation of the system. For this purpose a regenerating means is provided, this regenerating means including a heater represented by the reference character 25. The pump 16, besides supplying fluid to the spray 15, also supplies fluid to the coil 26 located in the heater 25 by means of the pipes 19 and 27. A pipe 28 controlled by a suitable valve 29 is provided for supplying a suitable heating medium to the heater 25, which heating medium may be in the form of steam or any other suitable heating medium, the heating medium leaving the heater by way of the pipe 30. It should be understood that the heater 25 may be heated by gas, electricity, or in any suitable manner. The temperature of the fluid leaving the heater 25 will depend upon the amount of the heating medium supplied thereto and consequently will depend upon the opening of the valve 29 and consequently the temperature of the fluid leaving the heater 25 is readily controlled.

The upper portion of the coil 26 communicates by means of a pipe 30 with a spray 31 located within a chamber 32 through which air is caused to flow upwardly by means of the fan 33 driven by the motor 34. The fluid leaving the spray 31 will be at a relatively high temperature and consequently the hygroscopic fluid which may be in the form of lithium chloride solution or a calcium chloride solution will be unable to absorb moisture from the air since the moisture absorbing properties of such solutions decrease as the temperature thereof increases. Instead of absorbing moisture from the air the solution will be sufficiently hot so that the air passing through the chamber 32 will absorb moisture from the heated solution and in this manner the concentration of the solution is increased. Located below the chamber 32 is a tank 36 which collects the now concentrated hygroscopic solution and delivers it by way of a pipe 37, a heat exchanger 38, and a cooler 39 back to the tank 18. The heat exchanger 38 is provided for preheating the solution being delivered to the heater 25 and for precooling the concentrated solution being delivered back to the tank 18. The cooler 39 is provided for further reducing the temperature of the solution to the proper value and for this purpose a cooling medium may be supplied thereto by means of a pipe 40 controlled by a valve 41, the cooling medium leaving the cooler by way of the pipe 42. While the valve 41 has been shown as being manually controlled, it will be understood that if desired this valve may be automatically controlled in any well known manner to maintain the temperature of the solution in the tank 18 at a desired value, but since this forms no part of the present invention such a control means has not been illustrated. It will be apparent that a suitably controlled refrigeration system may be employed for controlling the temperature of the solution in the tank 18.

It will now be understood that the reactivating system controls the concentration of the solution in the tank 18 and the concentration of this solution may be varied by varying the opening of the valve 29 since this valve controls the temperature of the solution passing to the spray 31, and the temperature of this solution will control the amount of moisture imparted thereby to the air or in other words, the amount of moisture removed from the solution. In order to control the position of the valve 29, use is made of the fact that the boiling point thereof varies in accordance with the concentration of the solution.

The reference character 50 illustrates a small boiler to which a small amount of the solution in the tank 18 is fed by the pump 16 and the pipe 51, the flow through which may be controlled by the valve 52. The outlet of the valve 52 communicates by means of the pipe 53 with a heat exchanger 54 which communicates with the boiler 50 at a position remote from the bottom thereof as illustrated in the drawing. It will be understood that this boiler is of very small size compared with the heater 25 and that the amount of solution supplied to this boiler is considerably less than is supplied to the heater 25. Heating means which may take the form of a burner 56 located below the boiler is provided for causing the solution within the boiler 50 to be maintained in a state of boiling at all times during operation of the system. A valve 57 is located in the fuel supply pipe to the burner 56 for controlling the supply of fuel thereto and this valve may be automatically controlled in a manner to be described. A small pipe 59 connected to the supply side of the valve 57 supplies gas to a constantly burning pilot for igniting the gas issuing from the main burner 56. Overflow pipe 58 is located within the boiler 50 and causes the level of the water in the boiler to be maintained constant, this overflow pipe passing within the heat exchanger 54 to the lower part of the air conditioning chamber 10 so that any liquid that passes through this overflow pipe will be effective for preheating the fluid being supplied to the boiler, the fluid passing through the pipe 58 at the same time being cooled and then passing back to the tank 18 by means of the pipe 21. The evaporated solution will pass from the upper portion of the boiler through the pipe 60 to the air conditioning chamber 10 where it will be condensed by the cool solution being sprayed from the spray 15 so that this evaporated solution will pass back to the tank 18. A pipe 61 controlled by a valve 62 connects the lower portion of the boiler with the overflow pipe 58 so that the boiler may be drained of the solution at any time if desired.

Located within the solution in the boiler 50 is a bulb 65 communicating by means of a capillary tube 66 with a bellows 67, the tube, bulb, and bellows being provided with a suitable volatile fill so that the bellows 67 will expand and contract in accordance with variations in temperature in the upper portion of the boiler. Pivoted at 68 is a lever having an arm 69 biased by means of a spring 70 into engagement with the upper portion of the bellows, this lever also including a second arm 71 which forms the slider arm of a potentiometer including the resistance 72. As the temperature in the boiler increases, the expansion of the bellows 67 will cause the slider arm 71 to move towards the right over the resistance 72 and as the temperature in the boiler decreases the arm 71 will move in the opposite direction over the resistance 72.

Located in the pipe 60 between the small boiler 50 and the air conditioning chamber 10 is a pivoted vane 63 which controls the position of a mercury switch 64 provided with terminals 85, 86, 87, and 88. When there is a flow of steam through the pipe 60 the vane 63 assumes the position illustrated in the drawing and in this position of the vane the terminals 85 and 86 of the mercury switch are connected together by the mercury element therein. Should the flow of steam through the pipe 60 cease due to the fact that the temperature of the solution in the boiler 50 is lowered below the boiling temperature the vane 63 will move to a substantially vertical position and the mercury switch 64 will be tilted in the opposite direction wherein the terminals 87 and 88 are connected together.

Controlled by the potentiometer 72 and the switch 64 is a motor 75 which includes an arm 76 connected by means of a link 77 to the stem 78 of the valve 29. The motor 75 may be a proportioning motor of the type illustrated in the patent to D. G. Taylor, No. 2,028,110 issued January 14, 1936. The extremities of the resistance 72 are connected by means of conductors 80 and 81 to the outer terminals of the motor 75. When the system is in operation and steam is flowing through the pipe 60 the mercury switch 64 will be in the position illustrated and in this position thereof the slider 71 is connected by means of the conductor 89, terminals 85 and 86 of the switch 64, and conductor 82 to the center terminal of the motor 75 so that when steam is flowing through the pipe 60, the motor 75 is controlled directly by the potentiometer 72 or in other words, in accordance with the temperature of the solution in the boiler 50. Power may be supplied to the motor by means of conductors 83 and 84 connected to any suitable source of power (not shown). As the concentration of the solution in the boiler 50 decreases, the boiling point of the solution, if the solution be lithium chloride or calcium chloride for example, will also decrease and accordingly the temperature of the evaporated solution affecting the bulb 65 will decrease and the slider arm 71 will move towards the left. This movement of the slider arm over the potentiometer will cause operation of the motor 75 to move the valve 29 towards wide open position by an amount which is proportional to the decrease in the boiling point of the solution in the boiler 50 or in other words, in accordance with the decrease of the concentration of the solution in the boiler 50 which is being fed directly from the tank 18. It will accordingly be seen that as the solution in the tank 18 becomes more dilute, more heat is supplied to the reactivating system, the temperature of the spray 31 increases, and more moisture is given up to the air passing through the chamber 32 by the hygroscopic fluid and in this manner the concentration of the solution in the tank 18 may be effectively controlled.

Should the concentration of the solution in the tank 18 become so high that no reactivation thereof is necessary, the boiling point will also become high and the valve 29 will be moved to a closed or minimum position thus reducing to a minimum the amount of heating medium being supplied to the heater 25 by means of a pipe 28. At this time it is unnecessary to circulate any of the solution through the heater 18 or to operate the fan 33 for drawing air upwardly through the chamber 32. Accordingly a mercury switch 90 is carried by an extension 91 of the arm 76 and this switch is moved to open position when the valve is in its closed or substantially closed position. This switch is provided to control the operation of a valve 92 which controls the flow of the solution to the spray 31, there being a suitable motor 93 which may be in the form of a solenoid for causing movement of the valve 92 to open position when the motor 93 is energized. The switch 90 also controls the operation of the motor 34 which drives the fan 33, this switch when in closed position, as illustrated, causing energization of the valve motor 93 and the fan motor 34. Line wires 95 and 96 are provided for supplying power to these motors, these wires being connected to a suitable source of power (not shown). With the switch 90 in the position illustrated, power is supplied to the fan motor 34 as follows: from the line wire 96 through the switch 90, conductors 98, 99, fan motor 34 and conductor 100 to the line wire 95. Power is also supplied at this time to the valve motor 93 as follows: from the line wire 96 through the switch 90, conductors 98, 101, valve motor 93 and conductor 102 to the line wire 95. It will now be apparent that as long as the valve 29 is in open position and switch 90 is in its closed position as illustrated, the fan 35 will operate to cause a flow of air upwardly through the chamber 32 and the valve 92 will be opened to permit a circulation of hygroscopic fluid through the coil 26 in the heater 25 to the spray 31. As soon as the valve 29 becomes closed however, then switch 90 moves to its circuit breaking position thus deenergizing the fan motor 34 and the valve motor 93, thus stopping the fan 33 and causing the valve 94 to move to closed position under the influence of gravity or any suitable biasing means (not shown).

Located within the space being conditioned is a humidity responsive element 115 controlling the position of a lever 116 pivoted at 117, there being a spring 118 connected to the lever 116 and tending to move the lever in a position to cause elongation of the humidity responsive element 115. The arm 116 cooperates with a contact 120 and upon an increase in humidity in the space the arm 116 will be moved downwardly out of engagement with the contact 120 by the spring 118 by reason of the elongation of the humidity responsive element 115. This humidity responsive device controls the energization of a relay 125, which relay comprises a coil 126 having an armature 127 which controls the position of the switch arm 128 which in turn cooperates with a fixed contact 129. Energization of the coil 126 causes movement of the arm 128 into engagement with the contact 129 and upon deenergization of the relay coil the arm 128 moves out of engagement therewith under the influence of gravity or any suitable biasing means (not shown). Power may be supplied to the relay 126 by means of the step-down transformer 130 comprising a low tension secondary 131 and a high tension primary 132 connected to the line wires 133 and 134 connected to a suitable source of power (not shown). When the humidity in the space is high, the arm 116 of the humidity responsive device will be in engagement with the contact 120, as illustrated, and the relay coil 126 will be energized as follows: from one side of the transformer secondary 131 through conductor 135, contact 120, switch arm 116, conductor 136, relay coil 126, and conductor 137 to the other side of the secondary 131.

The relay 125 controls the energization of the pump 16 and the motor 140 which may be in the form of a solenoid which in turn controls the position of the valve 57 for controlling the supply of gas to the main burner 56. Power is supplied to the pump 16 when the relay 125 is energized as follows: from the line 133 through conductor 142, the pump 16, conductor 143, switch arm 128, contact 129, and conductor 144 to the line wire 134. At the same time power is supplied to the solenoid or valve motor 140 as follows: from line wire 133 through conductors 142, 146, solenoid 140, conductors 147, 143, switch arm 128, contact 129, and conductor 144 to the line wire 134. It will thus be seen that as long as the humidity in the space is too high and there is a need for dehumidification the relay 125 is energized thus causing the pump 16 to operate and energizing the solenoid 140 to open the fuel supply valve 57 which controls the supply of fuel to the burner 56.

As soon as the humidity in the space drops to the desired value a circuit to the relay 125 is opened at the contact 120 thus deenergizing the pump 16 and the solenoid 140. The valve 57 now moves to closed position under the influence of gravity or a suitable biasing means (not shown) so that heat is no longed supplied to the small boiler 50 since it is unnecessary to cause reactivation of the hygroscopic fluid at this time. As the temperature of the solution in the boiler decreases, however, there will be a tendency for the valve 29 to be opened thus increasing the supply of steam to the regenerator 25. However, upon the cooling of the solution in the boiler 50, steam will no longer flow through the pipe 60 and the vane 63 will thus move downwardly and cause the mercury switch 64 to be tilted in the opposite direction. When this happens, the connection between the slider arm 71 and the center terminal of the motor is interrupted at the switch terminal 85 but the center and left hand terminals of the motor are directly connected together at this time by means of the following circuit: from the center terminal of the motor through conductor 82, switch terminals 87 and 88, and conductors 97 and 80 to the left hand terminal of the motor. The result of this is to cause the motor 75 to move the valve 29 to its entirely closed position so that heat is no longer supplied to the heater 25. At the same time the mercury switch 90 is tilted to open position which causes the fan motor 34 to be deenergized since it is not necessary at this time to draw air through the cooling tower 34. The system is now entirely shut down and will remain so until there is another call for dehumidification whereupon the pump 16 will be again placed into operation and the valve 57 will be opened thus causing the boiler 50 to heat up and steam to be generated therein. The slider 71 of the control potentiometer will assume a position corresponding to the temperature of the solution in the boiler and after steam starts to generate, the vane 63 will tilt back to the position shown thus placing the regenerating system in operation and causing the proper amount of heating medium to be supplied to the heater 25.

While I have described my invention more particularly with reference to the use of hygroscopic solutions of the lithium chloride or calcium chloride variety it will be obvious that any type of hygroscopic solution may be employed. With certain types of hygroscopic solutions, the boiling point decreases as the concentration increases and if solutions of this character are used then the motor 75 will be operated to move the valve 29 towards closed position as the boiling point of the solution decreases which would indicate an increase in concentration of the solution in the tank 18. Also while I have shown my invention as being automatically controlled it will be obvious that the principles of my invention are applicable to a system which might be manually controlled by observing the boiling temperature of the solution in the boiler 50 and manually adjusting the valve 29 in accordance with this temperature. For this purpose suitable indicia 110 may be provided for cooperation with the arm 71 to indicate the boiling temperature of the solution in the boiler 50.

It will now be understood that I have provided a relatively simple system for controlling the concentration of a solution by controlling the reactivation of the solution in accordance with the boiling temperature thereof and since the boiling temperatures of the solutions vary for varying concentrations over a wider range than the densities thereof, it is possible to more accurately control the concentration and the humidity absorbing power thereof than in prior systems wherein the reactivation is controlled directly in response to variations in the density of the solution. While my invention has been embodied in a dehumidifying system, it should be understood that the principles thereof are applicable to other systems wherein the concentration of a solution is to be controlled.

Many other modifications may also become apparent to those skilled in the art and I therefore desire to be limited only by the scope of the appended claims.

I claim as my invention:

1. In a system for controlling the concentration of a solution having a boiling point which varies with its concentration, the combination of, a concentrator for concentrating the solution including a regulable heater for variably heating the solution and a contacting device for contacting the heated solution with air to liberate an amount of moisture from the solution to the air depending upon the temperature of the solution, regulating means for regulating the heating effect of said heater and hence the concentrating effect of said concentrator, a boiler separate from the concentrator, means for supplying a sample of the solution being controlled to the boiler, means to heat the boiler sufficiently to boil the solution therein whatever its concentration may be, and means responsive to the concentration of the solution in the boiler comprising a thermostat responsive to the boiling temperature of the solution in the boiler for controlling the regulating means to cause heating of the solution to a temperature such that its subsequent contact with air will liberate the amount of moisture necessary for the solution to return the concentration of the solution to the desired value.

2. In a system for controlling the concentration of a solution, the combination of, a concentrator for concentrating the solution, regulating means for regulating the concentrating effect of said concentrator, a boiler separate from said concentrator, means for circulating a portion of the solution being controlled through the boiler to be boiled therein, means for providing heat exchange between the solution entering and leaving the boiler, and means responsive to the boiling temperature of the solution in the boiler for controlling the regulating means.

ALWIN B. NEWTON.